US010715645B2

(12) United States Patent
Wilson et al.

(10) Patent No.: US 10,715,645 B2
(45) Date of Patent: Jul. 14, 2020

(54) MOBILE DEVICE IMPACT PROTECTION

(71) Applicant: Racing Optics, Inc., Las Vegas, NV (US)

(72) Inventors: Bart E. Wilson, Las Vegas, NV (US); Gage S. Wilson, Las Vegas, NV (US)

(73) Assignee: Racing Optics, Inc., Las Vegas, NV (US)

( * ) Notice: Subject to any disclaimer, the term of this patent is extended or adjusted under 35 U.S.C. 154(b) by 0 days.

(21) Appl. No.: 15/675,952

(22) Filed: Aug. 14, 2017

(65) Prior Publication Data

US 2018/0054502 A1 Feb. 22, 2018

Related U.S. Application Data

(60) Provisional application No. 62/375,955, filed on Aug. 17, 2016.

(51) Int. Cl.
| | | |
|---|---|---|
| *H04M 1/18* | (2006.01) | |
| *G06F 1/16* | (2006.01) | |
| *G06F 3/01* | (2006.01) | |
| *B65D 81/02* | (2006.01) | |
| *H04B 1/3888* | (2015.01) | |

(Continued)

(52) U.S. Cl.
CPC ............ *H04M 1/185* (2013.01); *B65D 81/02* (2013.01); *G06F 1/1633* (2013.01); *G06F 1/1656* (2013.01); *G06F 1/1694* (2013.01); *G06F 3/016* (2013.01); *H04B 1/3888* (2013.01); *A45C 13/36* (2013.01); *A45C 2011/002* (2013.01); *G06F 2200/1633* (2013.01); *H04M 2250/12* (2013.01)

(58) Field of Classification Search
CPC combination set(s) only.
See application file for complete search history.

(56) References Cited

U.S. PATENT DOCUMENTS

| | | | |
|---|---|---|---|
| 6,603,620 | B1 | 8/2003 | Berding |
| 7,059,182 | B1 | 6/2006 | Ragner |
| 7,369,345 | B1 | 5/2008 | Rothkopf et al. |

(Continued)

FOREIGN PATENT DOCUMENTS

WO 2015064526 A1 5/2015

OTHER PUBLICATIONS

European Patent Office, Extended European Search Report for European Patent Application No. 17841927.1 dated Dec. 4, 2019, 10 pages.

(Continued)

*Primary Examiner* — Zhiyu Lu
(74) *Attorney, Agent, or Firm* — Fitch, Even, Tabin & Flannery, LLP (57) ABSTRACT

A mobile application communicates with an accelerometer in a mobile device to detects when a mobile device has been dropped. When the application detects that the device is dropped, it activates one or more protective features in the device. The protective features may result in physical changes in the device itself. For example, the protective feature may include activating the vibration feature of the device and increasing the voltage supplied to the vibration feature so that the device is vibrating at an increased vibration intensity when it contacts the ground. The vibrations can help to deflect, absorb, or otherwise mitigate the impact force imparted on the device from the contact surface or ground.

18 Claims, 4 Drawing Sheets

(51) Int. Cl.
   *A45C 13/36* (2006.01)
   *A45C 11/00* (2006.01)

(56) References Cited

U.S. PATENT DOCUMENTS

| | | |
|---|---|---|
| 7,382,567 B2 | 6/2008 | Liao |
| 7,450,332 B2 | 11/2008 | Pasolini |
| 7,477,469 B2 | 1/2009 | Cook |
| 7,525,751 B2 | 4/2009 | Han |
| 8,330,305 B2 | 12/2012 | Hart |
| 8,872,448 B2 | 10/2014 | Boldyrev |
| 8,903,519 B2 | 12/2014 | King |
| 9,195,269 B2 | 11/2015 | Rohrer |
| 9,288,305 B2 | 3/2016 | Turunen |
| 2002/0178375 A1 | 11/2002 | Whittaker |
| 2003/0016207 A1 | 1/2003 | Tremblay |
| 2004/0204149 A1* | 10/2004 | Kaneda ............... B06B 1/0207 455/567 |
| 2006/0109581 A1 | 5/2006 | Lee |
| 2006/0152842 A1 | 7/2006 | Pasolini et al. |
| 2009/0031808 A1 | 2/2009 | Kawahara |
| 2010/0127819 A1* | 5/2010 | Radivojevic ........ H04M 1/0202 340/3.1 |
| 2010/0294911 A1* | 11/2010 | Jacobs ................. F16F 1/37 248/636 |
| 2011/0305132 A1* | 12/2011 | Merrow ............... G11B 33/08 369/263.1 |
| 2012/0008269 A1 | 1/2012 | Gengler |
| 2012/0155678 A1* | 6/2012 | Liu ..................... H04R 17/00 381/190 |
| 2012/0232780 A1* | 9/2012 | Delson ................ A63F 13/06 701/400 |
| 2012/0253708 A1* | 10/2012 | Tanaka ............. B23Q 11/0039 702/56 |
| 2013/0226754 A1* | 8/2013 | Boldyrev .............. H04M 1/18 705/35 |
| 2013/0257582 A1* | 10/2013 | Rothkopf ............. G06F 1/1656 340/3.1 |
| 2014/0253284 A1 | 9/2014 | Peterson et al. |
| 2014/0260723 A1* | 9/2014 | Ely ....................... B06B 3/00 74/87 |
| 2015/0069205 A1* | 3/2015 | Moneer ................ F16F 15/027 248/550 |
| 2015/0177907 A1* | 6/2015 | Takano ................ G06F 3/016 345/173 |
| 2016/0241691 A1 | 8/2016 | Shiga |

OTHER PUBLICATIONS

Patent Cooperation Treaty, International Search Report for International Application No. PCT/US2017/046713 dated Dec. 5, 2017, 2 pages.
Patent Cooperation Treaty, Written Opinion of the International Searching Authority for International Application No. PCT/US2017/046713 dated Dec. 5, 2017, 6 pages.

* cited by examiner

MOBILE DEVICE IMPACT PROTECTION

RELATED APPLICATIONS

This application claims priority to U.S. provisional application No. 62/375,955, filed on Aug. 17, 2016, which is hereby incorporated by reference in its entirety.

TECHNICAL FIELD

The present disclosure generally relates methods and components for protecting a mobile device. More specifically, the present disclosure relates to mobile applications that activate device protection features when a phone is dropped or otherwise exposed to potential impact damage.

BACKGROUND

Mobile electronic devices can be an important tool for many users. Users rely on these mobile devices to for wide range of purposes that include communication, maintaining schedules, receiving information, mapping directions, storing documents and records, and providing entertainment, to name but a few. Because users depend on their mobile devices, they may feel debilitated if and when the device breaks or otherwise becomes inoperable.

Many mobile devices are not particularly durable or capable of withstanding significant impacts without sustaining damage. Mobile devices are by nature electronic, and thus depend on maintaining the integrity of many small electronic components, and the electronic connections between these components. Moreover, many of the surfaces on the mobile electronic devices are made of glass or other brittle materials that are inclined to break when the device is dropped or subjected to other impact forces. For some devices, particularly touch screen devices, breaking the display surface can render the entire device completely inoperable. Making matters even more difficult, the repair of these devices can be costly, and in some instances the damage may even be irreparable.

To help offset damage caused from impacts and drops, many users elect to protect their mobile devices with a protective cover or shield. The covers can help absorb impacts in some instances, but are not always sufficient by themselves to offset damage when a device is dropped or subject to significant impacts. Moreover, the covers can add unwanted weight and bulk to the device, thereby making it more cumbersome carry and operate. Protective shields also have drawbacks, in that they may impair the viewability and/or the touch sensitivity of the device display. Accordingly, alternative techniques for protecting mobile devices against impacts could be valuable to mobile device users.

SUMMARY

The present disclosure describes techniques for mitigating damage to a mobile device when subject to impact forces. In particular, the present disclosure describes techniques that activate protective measures when it is detected that the mobile device has been dropped or subject to sudden acceleration.

Many mobile devices are already equipped with an accelerometer that can detect motion and acceleration of the mobile device. These devices can run one or more software applications that use the accelerometer to detect when the mobile device has been dropped. In response to detecting that device has been dropped, the mobile device can activate (e.g., via one or more software applications) protective measures that mitigate, inhibit, and/or minimize damage that may result from the drop. For example, the mobile device, in response to detecting that it has been dropped, may activate the mobile device's vibration function so that the device is vibrating when it impacts the ground. The mobile device may also control a vibration generator to vibrate at an intensity level (e.g., vibration frequency and/or amplitude) greater than the default vibration intensity of the device. For instance, the mobile device may adjust the voltage supplied to the vibration generator so that the vibrations increase in frequency, amplitude, or both. The vibrations can cause the phone to absorb and/or deflect the impact.

DETAILED DESCRIPTION

The present disclosure describes examples of methods, devices, and software applications that protect a mobile device from damage when it has been dropped. In particular, the present disclosure describes applications that can be installed on a mobile device (and mobile devices with the applications installed thereon), and that operate to protect the mobile device against damage sustained from a drop or fall. The presently described applications can be used to activate protective features while the device is in mid-fall so as to inhibit or mitigate the damage sustained as a result of dropping the device, or to reduce the likelihood that a dropped device will sustain damage.

Mobile devices by definition are designed to be mobile. That is, they are designed so that a user can carry the device on his or her person. Many mobile devices, such as smart phones and tablets, are designed to be hand-held. As a result, these hand-held devices often experience a lot of movement and transfer from one location to another. For example, a hand-held mobile device may be placed into a pocket, into a purse or bag, or on a table countless times over the course of a day.

With this frequent handling of the device also comes an increased likelihood that the device will be dropped or otherwise mishandled, and thereby exposed to potential impacts from a fall. When dropped devices land on a hard surface, the device may sustain significant damage as a result of the impact upon landing. For example, the drop can cause the display surface (which is frequently made of glass or other fragile materials) can crack, shatter, or otherwise become damaged. Further, drops can cause internal electronic components in the device to dislodge or otherwise become disconnected from their intended operating position. The resulting damage from such drops can be extremely expensive to repair, and in some cases, the damage may be irreplaceable.

Figure 1:
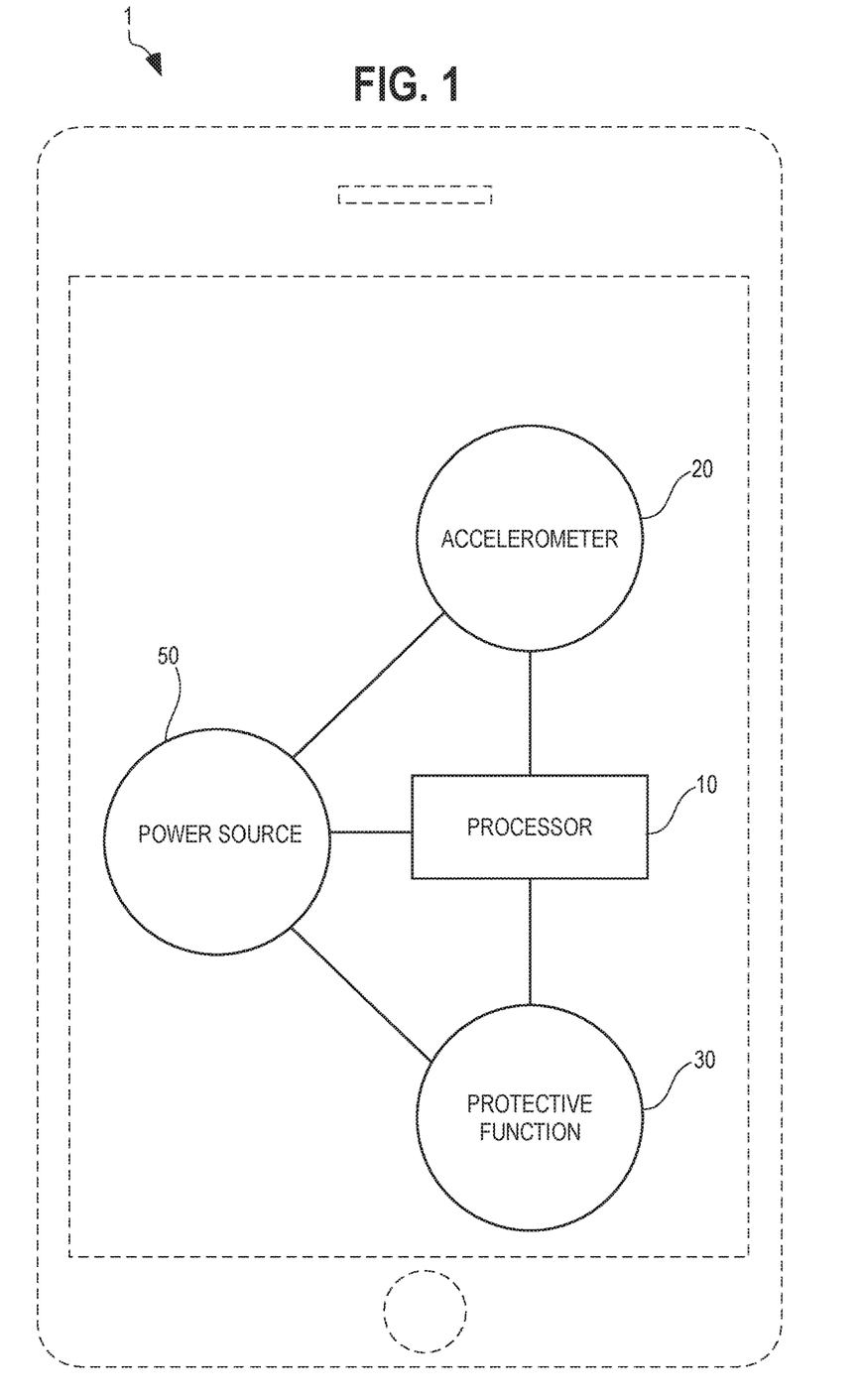
FIG. 1 is a block diagram showing the relationship among components of a mobile device in accordance with at least one example described herein.

The presently described technology aims to mitigate this damage, or to reduce the likelihood of sustaining damage, by detecting when the device has been dropped, and then activating features on the mobile device to protect against this damage. FIG. 1 is a block diagram showing components of a mobile device 1 operating a drop application ("drop app"), or otherwise configured to execute methods described herein. The drop app detects that the device has been dropped, and activates a protective function, such as a vibration function, to help mitigate damage that might otherwise be sustained from an impact following the drop.

The drop app is executed by a processor 10, which can be a microprocessor or a system of microprocessors on the mobile device 1. The mobile device 1 can be powered by a power source 50, such as a battery, a capacitor, or an AC power adapter. The power source 50 may supply electrical power to the mobile device 1, as well as its various components, such as the processor 10, the display, an accelerometer 20, a protective function 30, and other components.

The drop app can be an application that is obtainable post market, for example, from an app store such as iTunes or Google Play. In other examples, the application can be pre-installed on the mobile device. In still other examples, the application can be assigned to an independent "drop" processor that is dedicated to perform only the drop app so that it can execute the drop app functionality at the fastest possible speed without concern to other programs or applications that may be operating on the device.

Via the drop app, the processor 10 communicates with an accelerometer 20 or a tilt sensor on the mobile device. Many mobile devices are already equipped with accelerometers 20, and the drop app can be configured to operate in communication with such a device. However, in some examples, the drop app will be suitable for use on particular mobile devices that have a special accelerometer 20 designated solely for use with the drop app. For instance, where the mobile device has a dedicated processor to operate the drop app, as described above, the device may also include a dedicated accelerometer. In this manner, the drop app can be configured to continuously monitor the free fall state of the mobile device without being tied up executing other functionality of the mobile device.

The accelerometer 20 is a device that measures proper acceleration (g-force) on the device. The accelerometer 20 is thus configured to detect changes in the movement or tilt of the mobile device, and in particular, is configured to send signals to the processor 10 when the device is in a state of free fall. The accelerometer 20 can be a multi-directional accelerometer, or can be a system of multiple accelerometers that work together to determine the free fall status of the mobile device.

The accelerometer 20 can work in connection with the drop app to determine what accelerometer readings result in a determination that the device is in a state of free fall, thereby indicating that the device has been dropped. For example, an accelerometer at rest on the surface of the Earth will measure an acceleration of about 9.81 m/s$^2$ straight upwards. By contrast, accelerometers in free fall (falling toward the center of the Earth at a rate of about 9.81 m/s$^2$) will measure approximately zero. Accordingly, the accelerometer 20 and the processor 10 may be configured to determine that the mobile device has been dropped when the accelerometer 20 reading measures at a value close to or about zero. For example, the drop app can be configured to determine that the mobile device 1 has been dropped when the accelerometer 20 measures a g-force value of less than 3 m/s$^2$, less than 2 m/s$^2$, less than 1 m/s$^2$, less than 0.5 m/s$^2$, or less than 0.1 m/s$^2$. The g-force value used to determine free-fall status can vary depending on a variety of circumstances, including but not limited to the motion of the mobile device (e.g., if the device is traveling in a car, train, or airplane), the altitude of the mobile device, the height above ground of the mobile device, the air pressure, the temperature, weather conditions, and the weight of the mobile device. In some examples, the drop app may allow the user to adjust the sensitivity settings required to indicate free fall, so that the device does not result in frequent false alarms.

Upon determining that the mobile device 1 is in a state of free fall, the drop app activates a protective function 30. The protective function 30 is configured to mitigate, dissipate, or reduce the impact of a falling mobile device upon landing on the ground (or whatever surface the falling device may encounter). Additionally and/or alternatively, the protective function may serve to reduce the likelihood that the device will sustain damage from a fall, for example by increasing the likelihood that the device will land on a portion that is more suitable to sustain an impact.

Like the accelerometer 20, the protective function may already be a function of the mobile device. For example, activating a protective function 30 may include activating a vibration mechanism, or a vibrating function of the mobile device. By vibrating the mobile device, the falling device may be more likely to deflect and/or absorb impact forces caused by the fall, so that the fragile components of the device may not absorb as large of an impact force. Experimental data demonstrating the ability of vibrating devices to withstand impacts is discussed further below with respect to Table 1.

In some examples, the drop app can work with the power source of the mobile device in connection with the protective function 30. For example, the drop app may work in connection with a voltage controller that modifies, adjusts, or otherwise controls the voltage applied to the protective function 30.

Figure 3:
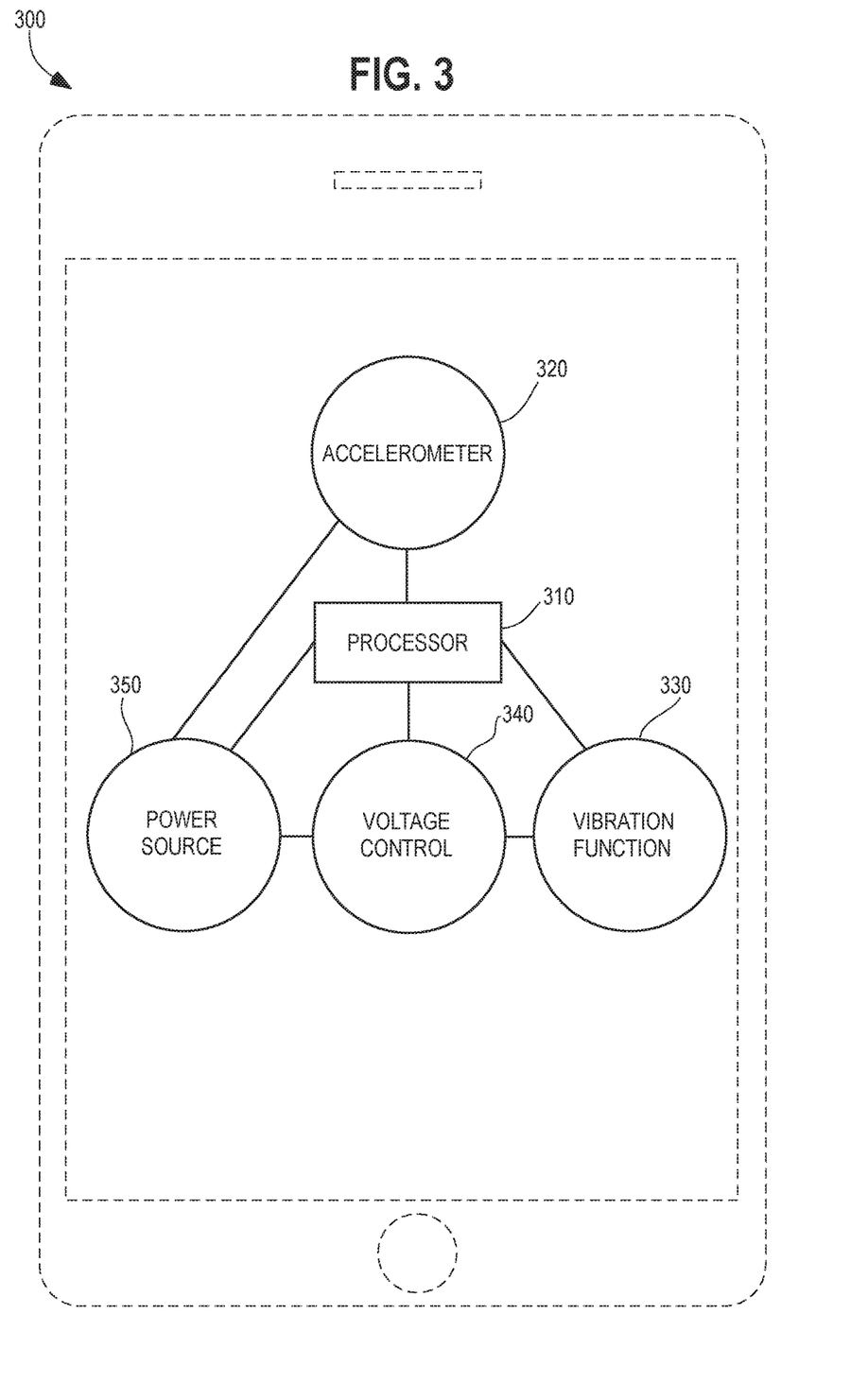
FIG. 3 is a block diagram showing the relationship among components of another example mobile device described herein.

FIG. 3 shows an example of a mobile device 300 that operates with a processor 310, a power source 350, an accelerometer 320, and a protective function that includes a voltage control 340 and a vibration function 330. The vibration function 330 may be controlled by a vibration generator that causes the device to vibrate or resonate. The vibration generator can be or include a variety of devices, including a taptic engine, a haptic device, linear oscillating vibration device, a linear resonant actuator, or other similar device. In some forms, the vibration generator can be a device that serves other functions, and which causes the device to vibrate as a side effect of those functions. For example, the vibration generator may include a speaker that causes the device to vibrate or resonate as a product of the production of sound.

As shown in FIG. 3, the processor 310 communicates with the accelerometer 320, the vibration function 330 or generator, and the voltage control 340, and also receives power (e.g., electrical power) from the power source 350. In this embodiment, the processor 310 communicate with a voltage controller 340 to adjust the voltage level applied from the power source 350 to the vibration generator 330 during a detected drop or fall. In this way, the processor 310 can adjust the vibration intensity over the default vibration intensity, for example. That is, the vibration intensity (e.g., vibration frequency and/or amplitude) during a drop or fall may be greater than the default vibration intensity applied during operations such as for notifications. Without wishing to be bound by theory, it is believed that an increased vibration intensity can help increase the impact resistance of a device upon impact, or at least increase the odds that a component of the device (e.g., the display screen) will survive an impact without sustaining significant damage. Because the processor 310 and/or a voltage controller can control the intensity of the vibration generator 330, the mobile device 300 is able to utilize a more intense vibration to help cushion a device upon impact or otherwise increase the odds that the device will survive an impact without damage. This can be particularly useful for mobile devices configured to vibrate at a reduced intensity level for default operations (e.g., generating notification signals) as a way to reduce noise and energy consumption.

In some examples, rather than adjusting the voltage to the vibration generator to increase the vibration intensity, the drop app may increase the vibration intensity using multiple vibration generating sources. For example, in one example, when a fall is detected, the processor 310 may activate a first vibration generator 330, such as a linear resonant actuator, simultaneously (or nearly simultaneously) with a second vibration generator 330, such as the speaker of the mobile device. By activating two vibration generators simultaneously, the drop app can cause the mobile device to vibrate at an intensity different from the default vibration intensity.

In some examples, the drop app may be configured to detect when a dropped device impacts a ground, and in response, to deactivate the vibration function. For example, the accelerometer 20/320 may be configured to detect an impact after being dropped. After the impact, the cushioning/deflection provided by the vibrations of the device may no longer be necessary, and the drop app may be configured to deactivate the vibrations to conserve energy and reduce noise. In other examples, the drop app and/or the mobile device will be configured to deactivate a vibration function after a particular amount of time. For example, after detecting a drop, the drop app may be configured to activate the vibration feature at an increased vibration intensity and then automatically deactivate it after 5 seconds or another predetermined amount of time (e.g., 2 seconds, 10 seconds, etc.) so that the vibration turns off after a reasonable amount of time after an impact.

As discussed above, the drop app may operate with a protective function 30 that turns on/off a vibration feature and controls the vibration intensity. In other examples, the application may be used on a particular mobile device that is equipped with other protective functionality. For example, the mobile device may be equipped with damping mechanisms that serve as a shock absorber for some of the components within the mobile device. In other examples, the protective function 30 may operate to reduce the falling speed of the mobile device, for example, by employing fans or parachute type features. In other examples, the protective function 30 may serve to orient the device, for example, by rotating the device in mid-air, so that the device lands in a position least likely to sustain damage (e.g., so that the device lands on a padded portion of the device, or so that the device lands with the display screen facing upwards).

Figure 2:
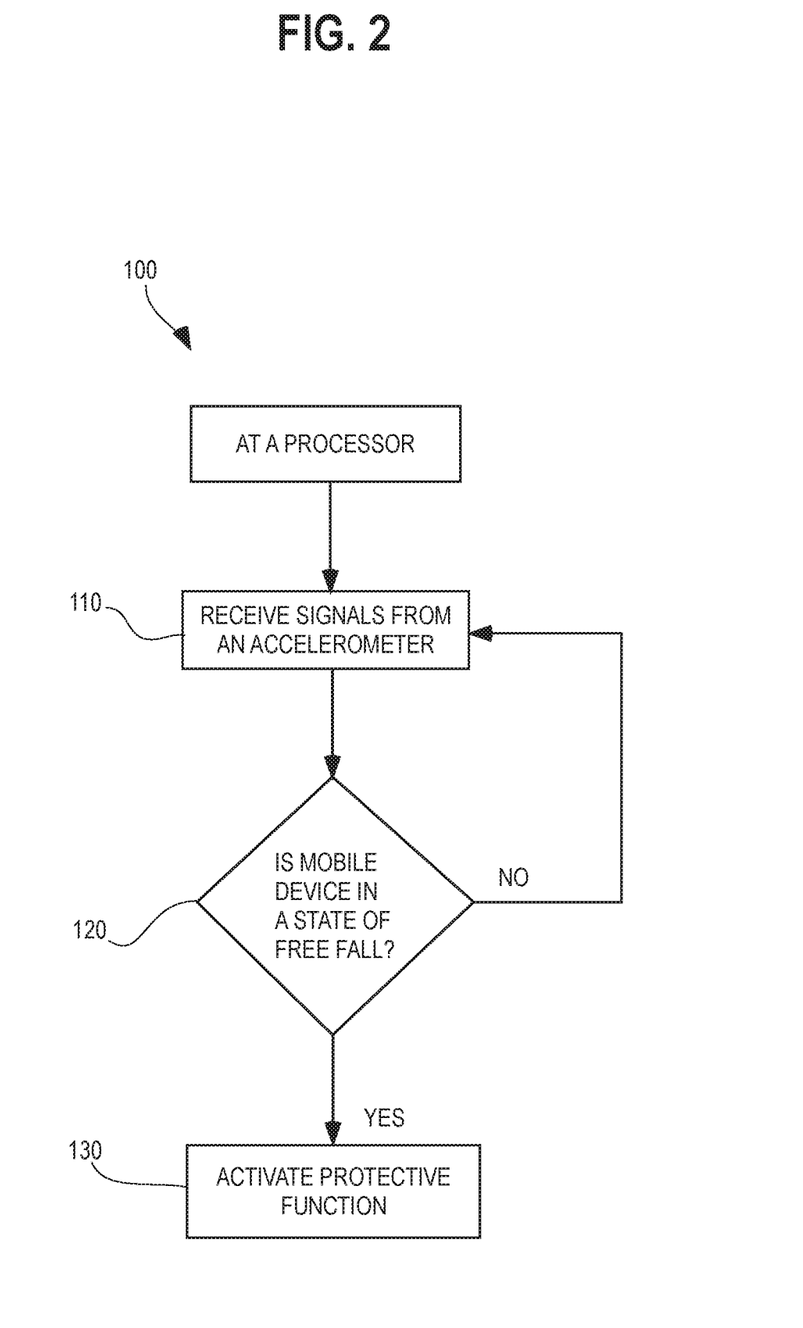
FIG. 2 is a flow diagram of a method in accordance with at least one example described herein.

FIG. 2 is a flow diagram of a method 100 executed by a processor for mitigating damage caused to a dropped mobile device. The method 100 may be performed by a processor (or a number of processors) operating the drop app as described above.

The method 100 involves receiving 110, at a processor (e.g., a processor of a mobile device) a signal from an accelerometer. The accelerometer signal provides a reading of the g-force acting on the mobile device. As noted above, the g-force reading of the accelerometer signal provides information pertaining to free-fall status of the mobile device.

The processor then determines 120 whether the mobile device is in a state of free fall. The processor makes this determination at least in part, on the g-force reading provided by the accelerometer. For example, where the accelerometer gives a signal indicating that the g-force has significantly dropped (e.g., it is at or approaching a value of zero), the processor may determine that the mobile device is in a state of free fall, which may correspond to a determination that the device has been dropped. If the processor determines that the device is not in a state of free fall, then the processor continues to receive signals from the accelerometer.

Upon making a determination that the mobile device is in a state of free fall, the method 100 then activates 130 a protective function of the mobile device. For example, the method 100 may activate 130 a vibration function of the mobile device so that the device is vibrating when it contacts the ground. In some examples, in addition to activating the vibration function, the activation step 130 may also include adjusting the vibration intensity of the mobile device so that the vibration intensity during a drop is different from a default vibration intensity. For instance, when the method 100 detects that the device is in a state of free fall, the activation 130 may include applying a greater than normal voltage level to a vibration generator so that the vibration generator causes the mobile device to vibrate at an increased frequency and/or amplitude as compared to a default vibration intensity. In some examples, the increase of vibration intensity may cause the mobile device to vibrate at a maximum vibration frequency and a maximum vibration intensity. In this manner, the vibrations may deflect the mobile device's impact with the ground, or otherwise serve to cushion, absorb, deflect or dissipate the impact force. In other examples, the method 100 may activate 130 additional and/or alternative functions, such as an air fan, a parachute, damping feature, shock absorbers, a tilt/rotation mechanism that moves the device in mid-air, and a shielding device.

In some examples, the method 100 may also include detecting an impact with the mobile device, such as an impact between the mobile device and the ground, signifying that the drop is complete. In response to detecting the impact, the method 100 may deactivate the protective function. For example, the method may turn off and/or reduce the intensity of a vibration function upon detecting an impact and/or determining that the device is no longer in a state of free fall.

Because most damage causing drops of a mobile device occur between 1 foot and 6 feet, the device will typically impact the ground within about 0.25 to about 0.61 seconds upon entering a state of free fall. Accordingly, the method 100 should be capable of performing steps 110, 120, and 130 within a time period of between about 0.25 and about 0.61 seconds. Accordingly, the method 100 may involve continuously receiving signals from the accelerometer so that the processor can quickly determine when the free-fall state of the mobile device changes. Moreover, the protective functions are configured to execute quickly and efficiently, so that the device is executing the protective function by the time the device hits the ground.

Figures 4A, 4B, 4C, 4D:
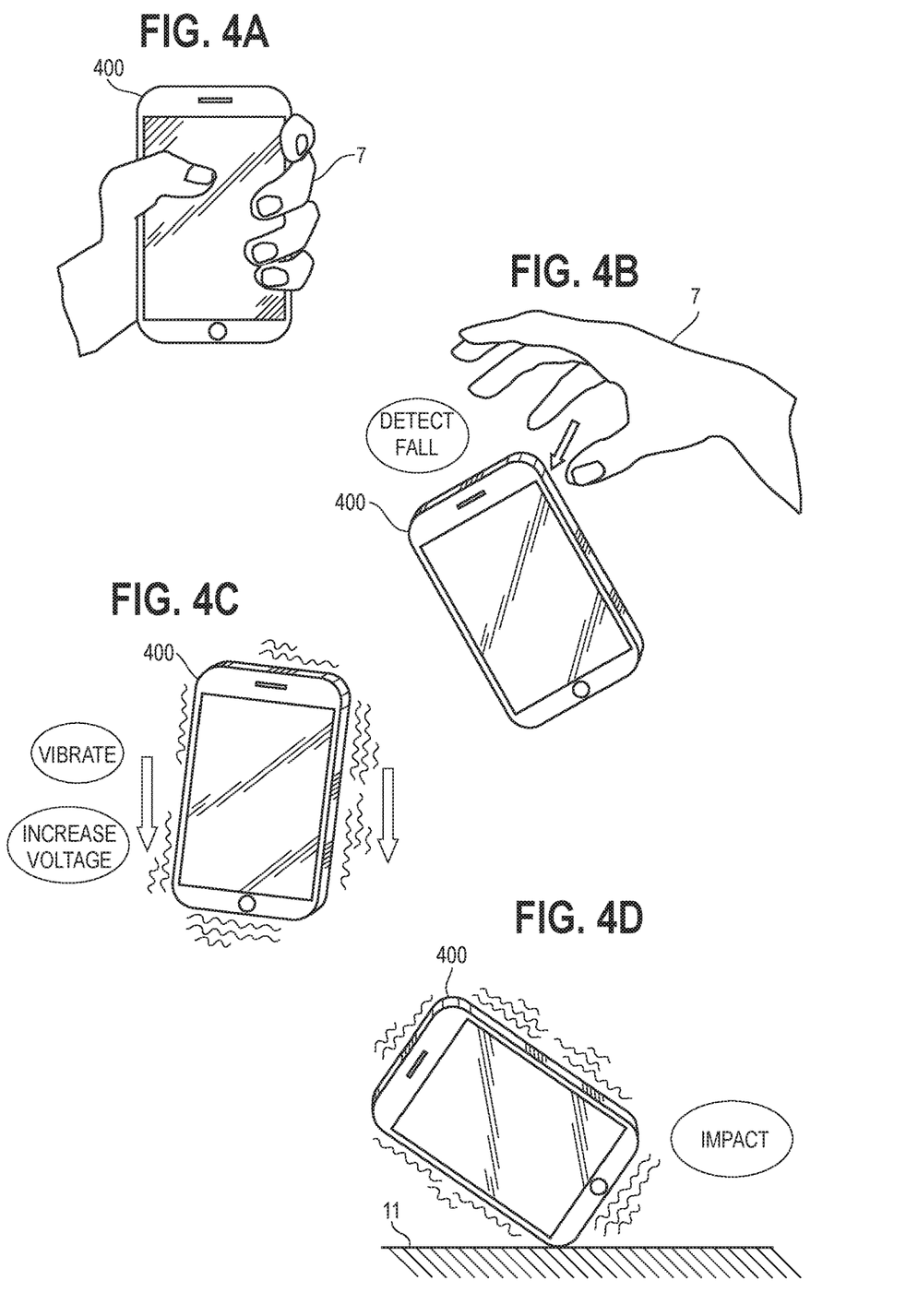
FIGS. 4A-4D depict a mobile device implementing an exemplary method described herein at various stages while being dropped.

FIGS. 4A-4D depict a mobile device implementing an exemplary method described herein at various stages while being dropped. In FIG. 4A, a user 7 is holding a mobile device 400 such as a smart phone. In FIG. 4B, the user drops the mobile device 400 and the device detects that it has been dropped, for instance, via an accelerometer and processor. Upon detecting that it is in a state of free fall, the device 400 begins to vibrate, as shown in FIG. 4C. In some examples, the device 400 may increase the voltage applied to the vibration feature so that it vibrates at an increased intensity (e.g., frequency and/or amplitude). FIG. 4D shows the device 400 impacting a surface 11, such as the ground, while vibrating. The vibrations help the device 400 absorb and/or deflect forces from the impact, thereby mitigating damage that may otherwise be sustained by the device 400, for example, in the form of cracks or breaks in the display screen.

EXAMPLES

Experiments were performed to determine the effect of an impact on a mobile device in a vibrating state versus a stationary, non-vibrating state. Tests were performed on mobile devices vibrating and non-vibrating and the results were compared. The tested mobile devices use linear resonant actuators to create vibration.

Tests were performed by dropping two different steel balls—one weighing 1.6 oz. and the other weighing 2.3 oz.—from escalating heights from 12 inches to 60 inches onto the display surfaces of mobile devices with and without the vibration feature activated. The tests were performed on both the iPhone SE and the iPhone 6. For each test performed on the vibrating device, the device's software was used to manually turn on the vibration feature for approximately 5 seconds prior to the dropping of the steel ball, and remaining on throughout impact. Results of the test are depicted in Tables 1 and 2 below.

TABLE 1

Drop test results on an IPHONE SE

| Drop Height | 1.6 oz ball No Vibration | 1.6 oz ball Vibration | 2.3 oz ball No Vibration | 2.3 oz ball Vibration |
|---|---|---|---|---|
| 12" | pass | pass | pass | pass |
| 24" | pass | pass | pass | pass |
| 36" | pass | pass | failure | pass |
| 48" | pass | pass | n/a | pass |
| 60" | pass | pass | n/a | pass |

TABLE 2

Drop test results on an IPHONE 6

| Drop Height | 1.6 oz ball No Vibration | 1.6 oz ball Vibration | 2.3 oz ball No Vibration | 2.3 oz ball Vibration |
|---|---|---|---|---|
| 12" | pass | pass | pass | pass |
| 24" | pass | pass | failure | pass |
| 36" | pass | pass | n/a | pass |
| 48" | pass | pass | n/a | pass |
| 60" | pass | pass | n/a | pass |

As shown in the results of Tables 1 and 2 above, both mobile devices passed drop tests at all heights (12"-60") for a 1.6 ounce ball regardless of whether the device was vibrating. For the larger 2.3 ounce ball, the first device experienced a failure (i.e., display screen breakage), after a 36 inch drop and the second device experienced failure after a 24" drop. However, both devices passed the 2.3 ounce ball drop test at all heights up to 60 inches while the device was vibrating. These tests were performed on mobile device in accordance with Ball drop test: ANSI Z87.1, which includes testing standards for safety eyewear. These results demonstrate that a vibrating device is capable of withstanding greater impacts than a non-vibrating device. In other words, activating a vibration feature before and during impact improves the display screen's ability to survive a drop. Increasing the vibration intensity, for example, by increasing the voltage to the maximizing the frequency of the vibration device during fall and impact can further improve the ability of the device to withstand even greater impacts.

The drop application(s) described herein are configured to detect a mobile device as it is falling, activate a vibration feature of the device with an increased, even maximum voltage to increase the vibration frequency, amplitude, or intensity, and turn off the vibration after a predetermined amount of time (e.g., 2, 5, or 10 seconds). In other forms, the drop app is configured to detect an impact or landing and then to deactivate the vibration feature. It is noted that the mobile devices are often configured to regulate the voltage to the vibration device to reduce battery consumption. They are also configured to regulate the vibration intensity and/or frequency to reduce the noise generated by the vibration, thereby increasing the privacy of the mobile device owner. This application describes techniques that override that regulation to increase the voltage to the vibration device, thereby increasing vibration intensity, at least for a short period of time, in order to protect the device from impacts during a fall. The described drop applications can be embodied in methods (e.g., methods of protecting a mobile device), apparatuses (e.g., mobile devices configured to operate in the manner described), or software (e.g., mobile applications configured to be operated by mobile devices in the manner described.

In one particular example, a method includes receiving, at a processor (e.g., a processor of the mobile device), an acceleration signal from an accelerometer in a mobile device. This receiving may involve monitoring (e.g., constantly or continuously monitoring) an accelerometer for a certain change in a g-force reading level. The method further involves analyzing the acceleration signal or the g-force reading level to determine if the mobile device is in a free fall state. For example, where the g-force is below a threshold level, the method may determine that the device is in free fall, thereby indicating that the device may have been dropped.

When it is determined that device is in free fall, a protection function of the mobile device is activated. The protection function is configured to change the physical state of the mobile device and to mitigate, inhibit, and/or minimize the severity of damage, from impacts to the mobile device. In some instances, the protection function may serve to reduce the likelihood that the impact will cause damage. For example, without the protection function, the dropped device may be 50% likely to sustain damage, but with the protection function activated, the dropped device may be only 25% likely to sustain damage, even if the damage sustained not reduced.

The protection function may be configured to change the physical state of the mobile device. For example, the protection function may cause the device to physically vibrate, to arm itself, or alter other physical conditions to mitigate, inhibit, and/or minimize damage from impacts to the mobile device caused by a dropped mobile device impacting a surface. In this way, a dropped mobile device may begin to vibrate (or exhibit other protective functions) while in mid-air. Where the protection function involves causing the device to vibrate, the protection device may cause the mobile device to vibrate at a predetermined frequency and/or amplitude (e.g., the maximum frequency and/or maximum amplitude that the vibrating mechanism is capable of obtaining). In some examples, the protective function may cause the device to vibrate at a frequency and/or amplitude that is outside of the normal operating vibrating frequency and/or amplitude range for the mobile device. The protective function may increase this vibration intensity via a voltage control or other device that regulates the electrical power and/or voltage applied to a vibration generator.

Some examples of the present technology relate to devices that are configured to perform the methods described herein. For example, the mobile device can be a smart phone or tablet equipped with a processor, an accelerometer, and a protection function (e.g., a vibrating mechanism). The processor can be configured to execute a drop app as described herein, so that the device activates a protection function when it determines that the device is in free fall. The mobile device can be an off the shelf mobile device with a drop app installed after market, or it can be a mobile device that is pre-installed with a drop app and associated hardware.

Other examples of the present technology relate to software applications configured to run on a processor of a mobile device. The software itself can be preloaded on a processor, or it can be loaded onto a processor from a mobile application market. The software application may include a set of instructions that can be stored on a non-transitory computer readable storage medium, such as a computer random access memory device or other similar device. The set of instructions includes computer readable program code embodied for execution on a processing system (e.g., one or more processors) of a mobile device. When the computer readable program code is executed by the processor, the processor can perform the methods described herein.

The presently described embodiments relate generally to techniques that protect a mobile device, because mobile devices are moved about readily and thus likely to be mishandled and dropped. It should be understood, however, that the described techniques do not need to be limited to mobile devices, and can be applied to other devices as well. For example, the techniques could be applied to desktop or laptop computers, power tools (e.g., cordless or corded power drills, saws, etc.), televisions, radios and music players, to name but a few. Indeed, the described techniques could be applied to any device that contains a processor or processing unit and an accelerometer, whether those devices are considered "mobile" or not.

The present disclosure describes examples of devices, systems. and techniques for protecting a mobile device from damage that it may sustain from being dropped. Those skilled in the art will recognize that a wide variety of modifications, alterations, and combinations can be made with respect to the embodiments described above without departing from the scope of the invention as set forth in the claims, and that such modifications, alterations, and combinations are to be viewed as being within the ambit of the inventive concept. In addition, it should also be understood that features of one embodiment described herein may be combined with features of other embodiments described herein to provide yet other embodiments as desired. All references cited in the present disclosure are hereby incorporated by reference in their entirety.

The invention claimed is:

1. A method for protecting a mobile device, the mobile device configured to vibrate at a default vibration intensity level and a protection vibration intensity level different from the default vibration intensity level, the method comprising:
receiving, at a processor, an acceleration signal from an accelerometer in the mobile device;
analyzing the acceleration signal with the processor to determine if the mobile device is in a free fall state; and
initiating a protection function of the mobile device in response to determining that the mobile device is in a free fall state, the initiating comprising:
activating a vibration generator that causes the mobile device to vibrate;
activating an auxiliary vibration generator that causes the mobile device to vibrate, the auxiliary vibration generator being a speaker; and
controlling the vibration intensity of the vibration generator and the auxiliary vibration generator so that the mobile device vibrates at the protection vibration intensity level,
wherein the protection vibration intensity level includes vibrating at one or more of a frequency and amplitude different from that of the default vibration intensity level to deflect and/or absorb impact forces without changing position of the mobile device.

2. The method of claim 1, further comprising supplying power from a power source to the vibration generator, wherein the controlling the vibration intensity comprises controlling the power supplied from the power source to the vibration generator.

3. The method of claim 2, wherein the controlling the vibration intensity comprises controlling the voltage supplied from the power source to the vibration generator.

4. The method of claim 3, wherein the controlling the vibration intensity comprises increasing the voltage supplied from the power source to the vibration generator so that the increased voltage supplied to cause the vibration generator to vibrate at the protection vibration intensity level is greater than a default voltage supplied to cause the vibration generator to vibrate at the default vibration intensity level.

5. The method of claim 1, wherein the vibration generator comprises a linear resonant actuator.

6. The method of claim 1, wherein the mobile device is configured to operate the vibration generator at the default vibration intensity level in response to receiving a communication signal.

7. The method of claim 1, wherein the protection vibration intensity level includes vibrating at one or more of a maximum vibration frequency and a maximum vibration amplitude.

8. The method of claim 1, wherein the vibration generator, accelerometer, and processor are each components of the mobile device, and wherein the method is performed by executing a mobile device application on the processor.

9. The method of claim 1, further comprising:
detecting an impact on the mobile device, and
deactivating the vibration generator in response to detecting the impact.

10. The method of claim 1, wherein the combined steps of analyzing the acceleration signal with the processor to determine if the mobile device is in a free fall and activating the protective function are performed in less than the time it takes the mobile device to fall three feet from a resting state.

11. A mobile device comprising:
a power source configured to supply electrical power to components of the mobile device;
an accelerometer configured to detect when the mobile device has entered a state of free fall;
a vibration generator configured to vibrate the mobile device upon activation;
an auxiliary vibration generator configured to vibrate the mobile device upon activation, the auxiliary vibration generator being a speaker;

a voltage control configured to adjust the voltage supplied from the power source to the vibration generator; and a processor in communication with the accelerometer, the vibration generator, the auxiliary vibration generator, and the voltage control, the processor configured to activate the vibration generator and the auxiliary vibration generator;

wherein the processor is configured to activate the vibration generator and the auxiliary vibration generator to vibrate and to effect the voltage control to adjust the voltage supplied from the power source to the vibration generator, wherein the processor is configured to cause the vibration generator to vibrate the mobile device at a default vibration intensity in response to receiving a first signal, and wherein the processor is configured to determine a free fall status of the mobile device based at least in part on communications received from the accelerometer, wherein the processor is configured to activate the vibrating mechanism and the auxiliary vibration generator and to cause the voltage control to increase the voltage supplied to the vibration generator in response to determining that the free fall status indicates that the mobile device is in a state of free fall, wherein the increased voltage causes the vibration generator to vibrate in combination with the auxiliary vibration generator to cause the mobile device to vibrate at a protection vibration intensity different from the default vibration intensity to deflect and/or absorb impact forces without changing position of the mobile device.

12. The mobile device of claim 11, wherein the processor operates a drop application, wherein the drop application is configured to determine the free fall status of the mobile device and to activate the vibrating mechanism.

13. The mobile device of claim 11, wherein the protection vibration intensity includes vibrating the mobile device at an increased frequency compared to the vibration frequency of the default vibration intensity.

14. The mobile device of claim 11, wherein the protection vibration intensity includes vibrating the mobile device at an increased amplitude compared to the vibration amplitude of the default vibration intensity.

15. The mobile device of claim 14, wherein the protection vibration intensity includes vibrating the mobile device at a maximum vibration frequency, a maximum vibration amplitude, or both.

16. A method for protecting a mobile device, the mobile device having a power source, the method comprising:

receiving, at a processor, a signal corresponding to a notification action;

activating a vibration generator to vibrate the mobile device at a first vibration intensity in response to receiving the signal corresponding to the notification action, the vibration generator powered by the power source at a first voltage level;

receiving, at a processor, an acceleration signal from an accelerometer in the mobile device;

analyzing the acceleration signal with the processor to determine whether the mobile device is in a free fall state; and in response to determining that the mobile device is in a free fall state:

activating the vibration generator to vibrate the mobile device;

activating an auxiliary vibration generator that causes the mobile device to vibrate, the auxiliary vibration generator being a speaker; and modifying the voltage level supplied from the power source to the vibration generator so that the vibration generator vibrates the mobile device at a second vibration intensity different from the first vibration intensity, the combination of vibration of the auxiliary vibration generator and the second vibration intensity being greater than the first vibration intensity to deflect and/or absorb impact forces without changing position of the mobile device.

17. The method of claim 16 further comprising detecting an impact on the mobile device and deactivating the vibration generator in response to detecting the impact.

18. The method of claim 16, wherein the modifying the voltage level comprises increasing the voltage level supplied from the power generator so that the second vibration intensity involves vibrating the mobile device at a greater frequency, amplitude, or both as compared to that of the first vibration intensity.

* * * * *